United States Patent [19]

Ueno et al.

[11] 4,454,284
[45] Jun. 12, 1984

[54] RESIN COMPOSITIONS CONTAINING POLYPHENYLENE OXIDE AND OLEFIN-GLYCIDYL (METH)ACRYLATE COPOLYMER

[75] Inventors: Katsuji Ueno, Hirakata; Takashi Maruyama, Kobe; Kazuo Hayatsu, Ibaraki, all of Japan

[73] Assignee: Sumitomo Chemical Company, Limited, Osaka, Japan

[21] Appl. No.: 333,022

[22] Filed: Dec. 21, 1981

[30] Foreign Application Priority Data

Dec. 25, 1980 [JP]  12251980 .......................... 55-186309

[51] Int. Cl.$^3$ .............................................. C08L 71/04
[52] U.S. Cl. .................... 524/427; 524/432; 524/504; 524/505; 524/508; 525/68; 525/92; 525/132; 525/133; 525/905
[58] Field of Search ............... 525/68, 132, 133, 208, 525/92, 905; 524/427, 432, 504, 505, 508

[56] References Cited

U.S. PATENT DOCUMENTS

| | | | |
|---|---|---|---|
| 3,361,851 | 1/1968 | Gowan | 524/508 |
| 3,665,058 | 5/1972 | Snodgrass et al. | 525/133 |
| 3,915,929 | 10/1975 | Kishikawa et al. | 525/208 |
| 4,166,055 | 8/1979 | Lee | 525/92 |
| 4,383,082 | 5/1983 | Lee | 525/905 |

FOREIGN PATENT DOCUMENTS 52-52991  4/1977  Japan ................................. 525/132

Primary Examiner—Wilbert J. Briggs, Sr.
Attorney, Agent, or Firm—Stevens, Davis, Miller & Mosher

[57] ABSTRACT

A resin composition comprising:
(A) a polyphenylene oxide resin or a resin composition containing polyphenylene oxide, and
(B) a copolymer of an olefin and glycidyl methacrylate and/or glycidyl acrylate.

The aforesaid resin composition is excellent in processability, impact resistance and oil resistance as well as adhesiveness with inorganic fillers such as glass fiber, calcium carbonate, silica, titanium oxide, etc.

13 Claims, No Drawings

RESIN COMPOSITIONS CONTAINING POLYPHENYLENE OXIDE AND OLEFIN-GLYCIDYL (METH)ACRYLATE COPOLYMER

This invention relates to a resin composition comprising a polyphenylene oxide resin or a resin composition containing polyphenylene oxide and a copolymer of an olefin and glycidyl methacrylate and/or glycidyl acrylate.

Polyphenylene oxide is a substance well known in the art. It has excellent thermal, mechanical and electrical properties, but on the other hand, it is poor in workability and low in impact strength, and for these reasons, it is usually not used singly but offered to the market in the form of a composite with other resins.

The resins used for forming a composite with polyphenylene oxide need be those having good compatibility with this substance, but such resins are limited. Presently known as such resins in the art are only polystyrene resins which are commercially available from the General Electric Co. by the name of noryl resins.

Therefore, development of a novel substance usable as a composite material with polyphenylene oxide will open up a new market and will have a great commercial significance.

The present inventors have found that a copolymer of an olefin and glycidyl methacrylate and/or glycidyl acrylate has good compatibility with polyphenylene oxide, and this invention was attained on the basis of such finding.

An object of this invention is to provide a novel resin composition containing polyphenylene oxide, which has been improved in processability, impact resistance and oil resistance.

Another object of this invention is to provide a novel resin composition containing polyphenylene oxide, which has been improved in adhesiveness with inorganic fillers such as glass fiber, calcium carbonate, silica, titanium oxide, etc. without lowering the physical properties of the composition when filled with these substances.

Other object and advantages of this invention will be apparent from the following description.

According to the present invention, there is provided a novel resin composition comprising (A) a polyphenylene oxide resin or a resin composition containing polyphenylene oxide and (B) a copolymer of an olefin and glycidyl methacrylate and/or glycidyl acrylate.

The "polyphenylene oxide resin" referred to in this invention is a polymer obtainable by subjecting at least one of the phenol compounds represented by the general formula:

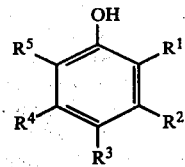

(wherein $R^1$, $R^2$, $R^3$, $R^4$ and $R^5$ are each selected from hydrogen, halogen atoms, hydrocarbon groups and substituted hydrocarbon groups, and at least one of them is always hydrogen atom) to oxidative polymerization with oxygen or an oxygen-containing gas by using an oxidative coupling catalyst.

As more definite exemplifications of $R^1$, $R^2$, $R^3$, $R^4$ and $R^5$ in the above-shown general formula, there may be given the following: hydrogen, chlorine, bromine, fluorine, iodine, methyl, ethyl, n- or iso-propyl, pri-, sec.- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and aryl.

Also, the following may be given as definite examples of the compounds of the above-shown general formula: phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. It is also possible to use the copolymers of other phenol compounds than those represented by the above-shown general formula, for example, polyvalent hydroxy aromatic compounds such as bisphenol-A, tetrabromobisphenol-A, resorcin, hydroquinone, novolac resin, etc., and the compounds of the above-shown general formula.

Most preferred among these compounds are a single polymer of 2,6-dimethylphenol or 2,6-diphenylphenol and a copolymer consisting of a major proportion of 2,6-xylenol and a minor proportion of 3-methyl-6-t-butylphenol or 2,3,6-trimethylphenol.

The oxidative coupling catalyst used in this invention for effecting oxidative polymerization of a phenol compound is not limited to a specific type; it is possible to use all types of catalysts having the required polymerizing ability. As preferred examples of such catalysts, the following may be mentioned: a catalyst composed of a cuprous salt and a tertiary amine, such as cuprous chloride-triethylamine and cuprous chloride-pyridine; a catalyst composed of a cupric salt, an amine and an alkali metal hydroxide, such as cupric chloride-pyridine-potassium hydroxide; a catalyst composed of a manganese salt and a primary amine, such as manganese chloride-ethanolamine and manganese acetate-ethylenediamine; a catalyst composed of a manganese salt and an alcoholate or phenolate, such as manganese chloride-sodium methylate and manganese chloride-alcoholate; and a catalyst composed of a combination of a cobalt salt and a tertiary amine.

The polyphenylene oxide resins usable in this invention also include those comprising said polyphenylene oxide grafted with a styrene polymer or other type of polymer. As for the preparation of these polyphenylene oxide resins, there may be employed, for example, a method in which a styrene polymer and/or other polymerizable monomer are subjected to an organic peroxide graft polymerization in the presence of polyphenylene oxide, as for example shown in Japanese Patent Publication Nos. 47826/72, 12197/73, 5623/74, 38596/77 and 30991/77, and a method in which said polyphenylene oxide, a polystyrene polymer and a radical forming agent are mixed and melted together as for instance taught in Japanese Patent Application Kokai (Laid-Open) No. 142799/77. These techniques in said patents are adopted to constitute a part of the construction of the present invention.

The "resin compositions containing polyphenylene oxide" in this invention mean the compositions consisting of said polyphenylene oxide and other high-molecular compounds. Examples of said "other high-molecular compounds" include the polyolefins such as polyethylene, polypropylene, ethylene-propylene block copolymers, polymethylpentene, and ethylene-α-olefin copolymers; the homopolymers and copolymers of various kinds of vinyl compounds such as polyvinyl chloride, polyvinylpyridine, polyvinylcarbazole, polyacrylamide, polyacrylonitrile, ethylene-vinyl acetate copolymers and alkenyl aromatic resins; such compounds as polycarbonate, polysulfone, polyethersulfone, polyethylene terephthalate, polybutylene terephthalate, polyarylene esters (for example, U-polymers available from Unitika Ltd.) and polyphenylene sulfide; polyamides such as 6-nylon, 6,6-nylon and 12-nylon; condensation high-molecular compounds such as polyacetal, and rubbery polymers. It is also possible to use various kinds of thermosetting resins such as silicone resin, phenolic resin, alkyd resin, unsaturated polyester resin, epoxy resin and dapon resin. The mixing ratio of polyphenylene oxide to other high-molecular compound may be selected from a wide range in which the amount of polyphenylene oxide and the other high-molecular compound are variable from 1 to 99% and 99 to 1% by weight, respectively. The optimum ratio is decided according to the type of the product to be obtained and the intended purpose of use. It is easy for those skilled in the art to decide such optimum ratio. Among said other high-molecular compounds, the following are preferred: polyolefins, polyamides, alkenyl aromatic resins, rubber-modified alkenyl aromatic resins and rubber polymers. Most preferred are alkenyl aromatic resins, rubber-modified alkenyl aromatic resins and rubber polymers.

The "alkenyl aromatic resins" used in this invention are selected from these containing at least 25% by weight of the polymer units derived from the monomers of the general formula:

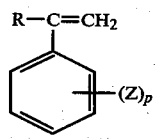

[wherein R is hydrogen, a lower alkyl group (for example, an alkyl group having 1-4 carbon atoms) or a halogen, Z is hydrogen, a vinyl group, a halogen or a hydroxyl group, and P is 0 or an integer of 1 to 5].

Examples of such alkenyl aromatic resins are homopolymers such as polystyrene, polychlorostyrene, poly-α-methylstyrene, etc., or copolymers thereof, and styrene-containing copolymers such as styrene-acrylonitrile copolymer, styrene-divinylbenzene copolymer, styrene-acrylonitrile-α-methylstyrene copolymer, etc. Among them, homopolystyrene, styrene-α-methylstyrene copolymer, styrene-acrylonitrile copolymer and styrene-methyl methacrylate copolymer are preferred, and homopolystyrene is most preferred.

The "rubber-modified alkenyl aromatic resin" referred to in this invention is a two-phase resin in which the rubber particles stay dispersed in an alkenyl aromatic resin matrix. Such rubber-modified alkenyl aromatic resin may be prepared by mechanically mixing a rubber material such as enumerated below and an alkenyl aromatic resin, or by dissolving said rubber material in an alkenyl aromatic monomer and then polymerizing said monomer. The latter method is employed industrially for the production of so-called impact-resistant polystyrene. The preparations obtained by mixing rubber and/or an alkenyl aromatic resin in the product obtained from the latter method are also included in the rubber-modified alkenyl aromatic resins in this invention.

The "rubbery polymers" referred to herein means the natural and synthetic polymers which are elastic at room temperatures, such as 20°–25° C. Examples thereof are natural rubber, diene rubber (such as polybutadiene, polyisoprene, polychloroprene, etc.) and a copolymer of diene and vinyl monomer (such as styrene-butadiene random copolymer, styrene-butadiene block copolymer, styrene-butadiene-styrene block copolymer, polybutadiene-styrene graft copolymer, butadiene-acrylonitrile copolymer, etc.), polyisobutylene and a copolymer of isobutylene and butadiene or isoprene, ethylene-propylene copolymer, Thiokol rubber, polysulfide rubber, acrylic rubber, polyurethane rubber, polyether rubber and epichlorohydrin rubber. Various modified versions of these rubbers (such as hydroxy- or carboxy-terminated polybutadiene and partially hydrogenated styrene-butadiene-styrene block copolymer) are also included in the rubber materials usable in this invention. Also, in the cases of diene rubber and diene and vinyl compound copolymers, those having various types of microstructure of double-bond (such as vinyl group, cis-1,4 bond, trans-1,4 bond, etc.) are also usable in this invention. Preferred rubbery polymers among them are copolymer composed of 40–100% by weight of butadiene and 60–0% by weight of styrene, copolymer composed of 65–82% by weight of butadiene and 35–18% by weight of acrylonitrile, styrene-butadiene copolymer, styrene-butadiene-styrene block copolymer (including linear, radial and all other types of block copolymers), styrene-grafted polybutadiene (prepared by adding styrene in polybutadiene or butadiene-styrene copolymer latex and emulsion-polymerizing the mixture with a radical initiator), ethylene-propylene copolymer and ethylene-propylene-diene copolymer.

Polyphenylene oxide and an alkenyl aromatic resin and/or a rubber-modified alkenyl aromatic resin may be mixed in all proportions, but preferably polyphenylene oxide is mixed in an amount of 5% by weight or above, more preferably 20% by weight or above. Polyphenylene oxide and a rubbery polymer may be also mixed in all possible proportions, but in case of forming a plastic, polyphenylene oxide is usually mixed in an amount of about 50% by weight or above, preferably 70% by weight or above. However, even when the amount of polyphenylene oxide is less than about 50%, there can be obtained a rubbery elastic product, and this product is also one of the useful preparations.

Regarding the copolymers of olefins and glycidyl methacrylate and/or glycidyl acrylate used as component (B) in this invention, the olefins usable in such copolymers include ethylene, propylene, butene-1, isobutylene, pentene-1, hexene-1, heptene-1, octene-1, decene-1, dodecene-1 and the like, and these olefins may be used either singly or in combination. Among these olefins, most preferred for use in this invention are ethylene and propylene. The copolymers used as component (B) may be those prepared by any of the copolymerization methods such as random copolymerization, block copolymerization and graft copolymerization.

The olefin content in the copolymers of olefins and glycidyl methacrylate and/or glycidyl acrylate may be varied within the range of 1 to 99% by weight, but when it is desired to elevate the impact value of the composition of this invention, the preferred range of olefin content is from about 55 to 90% by weight.

The mixing proportions of the components (A) and (B) in the composition of this invention may be freely selected in accordance with the object of use. For example, the proportion of the components (A) and (B) in the composition may be varied within the range of 99.5-0.5 and 0.5-99.5% by weight, respectively. Some preferred examples of such mixing proportions, as determined according to the type of the product to be obtained, are given below.

For example, in a composition comprising (A) a polyphenylene oxide resin or polyphenylene oxide and an alkenyl aromatic resin and (B) an olefin and glycidyl methacrylate and/or glycidyl acrylate, when it is desired to obtain an impact-resistant engineering plastic, the preferred content of the component (B) is from 3 to 30% by weight, more preferably from 5 to 20% by weight.

This composition can provide a peerlessly high impact value and suffers no drop of impact value during high-temperature molding.

In the case of a composition consisting of (A) a polyphenylene oxide resin, an alkenyl aromatic resin and a rubbery polymer and (B) an olefin and glycidyl methacrylate and/or glycidyl acrylate, when an impact-resistant engineering plastic is to be obtained, the content of the component (B) is preferably selected from within the range of 0.5-20% by weight, more preferably the range of 1-10% by weight, although this range is variable depending on the amount of the rubbery polymer in the component (A). This composition shows a marked improvement of impact strength even though the component (B) is of a small proportion in the composition.

In a composition comprising, as component (A), a polyphenylene oxide resin, or a composition consisting of polyphenylene oxide and an alkenyl aromatic resin or consisting of polyphenylene oxide, an alkenyl aromatic resin and a rubbery polymer, and as component (B), a copolymer of an olefin and glycidyl methacrylate and/or glycidyl acrylate as well as an inorganic filler such as glass fiber, calcium carbonate, silica, zinc oxide, $TiO_2$ or the like, the content of the component (B) should preferably be within the range of 1-40% by weight to the sum of the components (A) and (B), more preferably 5-30% by weight. This composition is liable to deterioration of the mechanical properties such as impact strength if it is devoid of the component (B), but such problem can be evaded by the presence of the component (B). These examples are but exemplification of only a few preferred embodiments of this invention, and needless to say, the mixing proportions of the components (A) and (B) can be varied in other various ways in accordance with the type of the product to be obtained and the purpose of use.

Further, the copolymer in the component (B) in the composition of this invention may contain other copolymerizable vinyl compound or compounds such as styrene, vinyl acetate, methyl methacrylate, vinyl chloride, methyl acrylate, ethyl acrylate, α-methylstyrene, divinylbenzene, tetrafluoroethylene, difluoroethylene, vinylidene chloride, acrylonitrile, acrylic amide and the like.

The method for preparing the composition of this invention is not limited to any specific formula but any ordinary known process may be employed. From the industrial standpoint, however, it is desirable to use a method in which the respective components are first dry-blended by a suitable means such as a Henschel mixer and then the mixture is melted, further mixed up and extruded.

Both temperature and time for the melting and mixing operations are not subject to any specific limitations, but as for the temperature, although it depends on the mixing proportions of the respective components, it is usually within the range of 150°-350° C. As regards the mixing means, there may be employed any method which is capable of treating the molten viscous material in a desired way, and such operation may be performed according to either a batch system or a continuous system. Examples of the mixing devices usable for this purpose include Banbury mixer, roll, extruder and kneader.

In practicing the present invention, one is free to add a reinforcing material such as glass fiber, carbon fiber, etc., an inorganic or organic filler such as carbon black, silica, $TiO_2$, etc., and other additives such as plasticizer, stabilizer, fire retardant, dye and pigment. The "reinforcing material" used in this invention is a material which, when blended in the composition, helps to increase bending strength, bending modulus of elasticity, tensile strength, modulus in tension, heat deformation temperature, etc., and as examples of such reinforcing material, there may be given alumina fiber, carbon fiber, glass fiber, high-elasticity polyamide fiber, high-elasticity polyester fiber, silicon carbide fiber, titanate whisker and the like. Such reinforcing material may be blended in any amount capable of deriving the desired reinforcement, but usually it is preferably blended in an amount within the range of about 5 to 100 parts by weight of 100 parts by weight of the composition. The most preferred reinforcing filler is glass, particularly glass fiber filaments composed of lime-aluminum borosilicate glass which is relatively small in sodium content. Such glass is generally known as "E-glass". However, for uses where the electrical properties are not of imperative requirement, there may be used other types of glass with low sodium content, such as one generally known as "C-glass". The filaments may be produced by any suitable known method such as steam or air blowing, flame blowing or mechanical drawing. Mechanical drawing is best suited for obtaining the preferred filaments for plastic reinforcement. The filaments used in this invention are preferably those having a diameter within the range of about 2-20μ, but such is not critical in this invention. One is also free in this invention to select any length of the glass filaments or to bundle such filaments and further assemble the bundled fibers into threads, ropes or roving or weave them into a mat or such. However, for the preparation of the composition according to this invention, it is convenient to use the glass fibers which have been cut into the form of strands having a length of about 0.3-3 cm, preferably less than about 0.6 cm.

As for the flame retardant used in this invention, a group of compounds well known in the art as flame retarding material may be employed. Generally, there are used the compounds containing the flame retardancy-imparting elements such as bromine, chlorine, antimony, phosphorus or nitrogen. Examples of such compounds are halogenated organic compounds, antimony oxide, combinations of antimony oxide and halogenated organic compounds, combinations of antimony oxide and phosphorus compounds, phosphorus as used singly or phosphorus compounds, combinations of phosphorus compounds and the compounds having phosphorus-nitrogen bonds, or mixtures thereof.

The amount of such flame retardant added in the composition is not critical; it may be added in any amount sufficient to impart required flame retardancy. However, too much addition of such flame retardant should be avoided as it impairs the physical properties of the composition such as lowered softening point. It is easy for those skilled in the art to determine the proper amount of such flame retardant to be added in the composition. Generally, it is suggested to blend said flame retardant in an amount of 0.5–50 parts by weight, preferably 1–25 parts, more preferably 3–15 parts by weight to 100 parts by weight of the mixture of a polyphenylene oxide resin and a rubber-modified alkenyl aromatic resin.

The halogen-containing compounds useful as flame retardant in the composition of this invention are those of the following general formula:

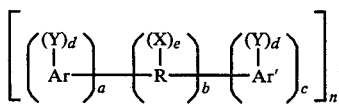

wherein n is a number of 1 to 10, and R is selected from the group consisting of the radicals such as alkylene, alkylidene or alicyclic bonds (such as methylene, ethylene, propylene, isopropylene, isopropylidene, butylene, isobutylene, amylene, cyclohexylene, cyclopentylidene, etc.), ether, carbonyl, amine or sulfur-containing bonds (such as sulfide, sulfoxide, sulfone, etc.), carbonate, phosphorus-containing bonds and the like. R may also represent a group comprising two or more alkylene or alkylidene bonds combined by a group such as amino, ether, ester, carbonyl, sulfide, sulfoxide, sulfone or phosphorus-containing bond. Ar and Ar' are each a mono- or polycarbocyclic aromatic group such as phenylene, biphenylene, terphenylene, naphthylene or the like. Ar and Ar' may be same or different from each other. Y is a substituent selected from the group consisting of organic or inorganic groups or organometallic groups. The substituent represented by Y may be (1) a halogen such as chlorine, bromine, iodine or fluorine, (2) an ether group of the general formula: OE (wherein E is a monovalent hydrocarbon group same as represented by X mentioned below), (3) an —OH group, (4) a monovalent hydrocarbon group such as represented by R, or (5) other kinds of substituent such as nitro group or cyano group. When d is two or above, Y's may be same or different from each other. X is a monovalent hydrocarbon group, for example, an alkyl group such as methyl, ethyl, propyl, isopropyl, butyl, or decyl, an aryl group such as phenyl, naphthyl, biphenyl, xylyl or tolyl, an aralkyl group such as benzyl or ethylphenyl, a cyclic aliphatic group such as cyclopentyl or cyclohexyl, or a monovalent hydrocarbon group containing an inert substituent therein. When two or more X's are included, they may be same or different from each other. d Is an integer ranging from 1 to a maximal value equal to the greatest possible number of the substitutable hydrogen atoms on the aromatic ring comprising Ar or Ar', and e is an integer ranging from 0 to a maximal value which is decided by the number of the substitutable hydrogen atoms on R. a, b And c are each an integer including 0. When b is not 0, neither a nor c is 0, or otherwise one of a and c may be 0. When b is 0, the aromatic groups are bonded to each other by a direct carbon-carbon bond. The hydroxyl groups or substituents Y on the aromatic groups Ar and Ar' may freely take their ortho-, meta- or para-position on the aromatic ring.

Listed below are examples of the compounds represented by the above-shown formula:
2,2-bis-(3,5-dichlorophenyl)-propane,
bis-(2-chlorophenyl)-methane,
1,2-bis-(2,6-dichlorophenyl)-ethane,
1,1-bis-(4-iodophenyl)-ethane,
1,1-bis-(2-chloro-4-iodophenyl)-ethane,
1,1-bis-(2-chloro-4-methylphenyl)-ethane,
1,1-bis-(3,5-dichlorophenyl)-ethane,
2,2-bis-(3-phenyl-4-bromophenyl)-ethane,
2,3-bis-(4,6-dichloronaphthyl)-propane,
2,2-bis-(2,6-dichlorophenyl)-pentane,
2,2-bis-(3,5-dichlorophenyl)-hexane,
bis-(4-chlorophenyl)-phenylmethane,
bis-(3,5-dichlorophenyl)-cyclohexylmethane,
bis-(3-nitro-4-bromophenyl)-methane,
bis-(4-oxy-2,6-dichloro-3-methoxyphenyl)-methane,
2,2-bis-(3,5-dibromo-4-oxyphenyl)-propane,
2,2-bis-(3,5-dichloro-4-oxyphenyl)-propane,
2,2-bis-(3-bromo-4-oxyphenyl)-propane,
and those of the bis-aromatic compounds in which sulfide, sulfoxy or such is incorporated instead of two aliphatic groups. Also included in the compounds represented by the above-shown formula are tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl, halogenated diphenyl ethers containing 2–10 halogen atoms, and oligomers with a polymerization degree of 1 to 20 polycondensed from 2,2-bis-(3,5-dibromo-4-oxy-phenyl)-propane and phosgene. The preferred halogen compounds for use in this invention are the aromatic halogen compounds such as chlorinated benzene, brominated benzene, chlorinated biphenyl, chlorinated terphenyl, brominated biphenyl, brominated terphenyl and the like, or the compounds containing two phenyl nuclea separated by a divalent alkylene group and having at least two chlorine or bromine atoms for each phenyl nucleus, or a mixture of at least two of said compounds. Most preferred are hexabromobenzene and chlorinated biphenyl or terphenyl or a mixture thereof with antimony oxide.

Typical of the preferred phosphorus compounds for use in this invention are those having the following general formula and the nitrogen-simulant compounds,

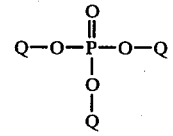

wherein Q's may be same or different and each represents a hydrocarbon group such as alkyl, cycloalkyl, aryl, alkyl-substituted aryl or aryl-substituted alkyl, a halogen, hydrogen or a combination thereof. As the typical examples of the preferred phosphoric acid esters, there may be given the following: phenylbisdodecyl phosphate, phenylbisneopentyl phosphate, hydrogenphenylethylene phosphate, phenyl-bis-(3,5,5'- trimethylhexyl) phosphate, ethyldiphenyl phosphate, 2-ethylhexyldi-(p-tolyl)phosphate, hydrogendiphenyl phosphate, bis-(2-ethylhexyl)-p-tolyl phosphate, tritolyl phosphate, bis-(2-ethylhexyl)-phenyl phosphate, tri(-nonylphenyl) phosphate, hydrogenphenylmethyl phosphate, di-(dodecyl)-p-tolyl phosphate, triphenyl phosphate, halogenated triphenyl phosphate, dibutylphenyl phosphate, 2-chloroethyldiphenyl phosphate, p-tolyl-bis-(2,5,5'-trimethyhexyl) phosphate, 2-ethylhexyl-diphenyl phosphate and hydrogendiphenyl phosphate. Among them, triphenyl phosphate is most preferred. It is also desirable to use triphenyl phosphate in combination with hexabromobenzene or antimony oxide. Among other flame retardant additives usable in this invention are the compounds having phosphorus-nitrogen bonds such as phosphorus nitride chloride, phosphoric ester amide, phosphoric acid amide, phosphonic acid amide, tris(aziridinyl)phosphine oxide and tetraquis(oxymethyl)phosphonium chloride.

The present invention is further described below by way of the Examples but these Examples are merely intended to be illustrative and not restrictive to the scope of the invention.

EXAMPLE 1

Poly-(2,6-dimethyl-1,4-phenylene oxide) ($[\eta]=0.55$ as measured at 25° C. in $CHCl_3$) obtained from oxidative polycondensation of 2,6-xylenol and an ethylene-glycidyl methacrylate copolymer (BONDFAST®-E by Sumitomo Chemical Company, Ltd.) were mixed in the ratios shown in Table 1 by using an extruder (double-screw extruder Model PCM-30 by Toshiba Machinery). (Mixing temperature: approx. 280° C.).

The obtained pellets were compression molded to form the Izod impact test pieces and their impact value was measured. By way of comparison, there were similarly formed the Izod impact test pieces by using a low-density polyethylene (SUMIKATHENE®F-101-1 produced by Sumitomo Chemical Company, Ltd.) instead of the ethylene-glycidyl methacrylate copolymer, and their impact value was similarly measured.

TABLE 1

| Mixing ratio (wt %) | | | Izod impact strength (notched) kg · cm/cm² |
|---|---|---|---|
| Poly-phenylene oxide | Ethylene-glycidyl methacrylate copolymer | Poly-ethylene | |
| Example | | | |
| 40 | 60 | — | 26.1 |
| 60 | 40 | — | 38.2 |
| 70 | 30 | — | 47.5 |
| 90 | 10 | — | 30.1 |
| Comparative example | | | |
| 40 | — | 60 | 4.3 |
| 70 | — | 30 | 4.1 |
| 90 | — | 10 | 3.1 |

As is apparent from Table 1, the compositions of the Comparative Example comprising polyphenylene oxide and polyethylene are low in impact strength whereas the compositions of this invention comprising polyphenylene oxide and an ethylene-glycidyl methacrylate copolymer are strikingly high in impact strength, indicating good compatibility of polyphenylene oxide with the ethylene-glycidyl methacrylate copolymers.

EXAMPLE 2

Polyphenylene oxide used in Example 1, an impact-resistant polystyrene (ESBRITE®500-A produced by Nippon Polystyrene Co., Ltd.) and the ethylene-glycidyl methacrylate copolymer used in Example 1 were melted and mixed by an extruder and the test pieces were formed in the same way as in Example 1, and their impact strength was measured.

The mixing ratios of the respective resin materials and the results of measurement of impact strength are shown in Table 2. As a Comparative example, the same composition as above except that no ethylene-glycidyl methacrylate copolymer was contained was used. The result obtained is shown in Table 2.

TABLE 2

| Mixing ratio (wt %) | | | Izod impact strength (notched) kg · cm/cm² |
|---|---|---|---|
| Polyphenylene oxide | Impact-resistant polystyrene | Ethylene-glycidyl methacrylate copolymer | |
| Example | | | |
| 50 | 50 | 1 | 18.3 |
| 50 | 50 | 3 | 20.6 |
| 50 | 50 | 10 | 29.3 |
| Comparative example | | | |
| 50 | 50 | — | 9.1 |

As is seen from Table 2, blending of only a small quantity of an ethylene-glycidyl methacrylate copolymer in the compositions consisting of polyphenylene oxide and rubber-modified polystyrene results in a phenomenal improvement of impact strength.

EXAMPLE 3

40 Parts by weight of polyphenylene oxide used in Example 1, 50 parts by weight of impact-resistant polystyrene (COSDEN®-945 produced by Cosden Oil Co.) and 10 parts by weight of ethylene-glycidyl methacrylate copolymers with different ethylene/glycidyl methacrylate mixing ratios were melt-blended and worked into the test pieces in the same manner as in Example 1, and their impact strength was measured. The results are shown in Table 3.

TABLE 3

| Ethylene/glycidyl methacrylate (wt. ratio) | Izod impact strength (notched) kg · cm/cm² |
|---|---|
| 95/5 | 29.3 |
| 90/10 | 30.6 |
| 50/50 | 27.1 |
| 70/30 | 25.3 |

EXAMPLE 4

26 Parts by weight of EPDM rubber (ESPRENE®301 produced by Sumitomo Chemical Company, Ltd.) and 520 parts by weight of 2,6-xylenol were dissolved in 3,350 parts by weight of xylene, and then 12.6 parts by weight of manganese chloride, 838 parts by weight of methanol and 91.7 parts by weight of ethanolamine were fed thereinto and the mixed materials were polymerized at 30° C. for 5 hours by blowing oxygen into the mixture to obtain as EPDM-modified polyphenylene oxide. By using the thus obtained EPDM-modified polyphenylene oxide, a composition was prepared according to the following recipe.

| Components | Mixing ratio (parts by weight) |
| --- | --- |
| EPDM-modified polyphenylene oxide | 50 |
| Impact-resistant polystyrene (ESBRITE ® 500 AS produced by Nippon Polystyrene) | 50 |
| Ethylene-glycidyl methacrylate copolymer (BONDFAST ®-E produced by Sumitomo Chemical Co., Ltd.) | 3 |
| Triphenyl phosphate | 3 |
| Antimony trioxide | 3 |
| Titanium oxide | 2 |

The injection molding of the above composition had an Izod impact strength of 31.3 kg.cm/cm$^2$.

EXAMPLE 5

A test specimen was prepared in the same manner as in Example 3 except for use of an ethylene-glycidyl methacrylate-vinyl acetate copolymer (the mixing ratio by weight of the components being approx. 82:12:6) instead of the ethylene-glycidyl methacrylate copolymer, and the impact strength of this specimen was measured. It was 28.3 kg.cm/cm$^2$.

What is claimed is:

1. A melt-blended resin composition comprising a mixture of
   (A) a polyphenylene oxide resin or a resin composition containing polyphenylene oxide, and
   (B) a copolymer of an olefin and glycidyl methacrylate and/or glycidyl acrylate, containing said olefin in an amount of 1 to 99% by weight.

2. The resin composition according to claim 1, wherein the component (A) is a polyphenylene oxide resin which is one obtained by subjecting one or more of the phenols represented by the general formula:

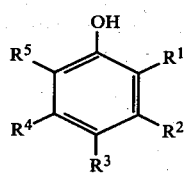

(wherein R$^1$, R$^2$, R$^3$, R$^4$ and R$^5$ each represents hydrogen, a halogen, a hydrocarbon group or a substituted hydrocarbon group, and at least one of them is always hydrogen) to oxidative coupling polymerization.

3. The resin composition according to claim 2, wherein the phenol is at least one member selected from the group consisting of phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol.

4. The resin composition according to claim 1, wherein the component (A) is a resin composition containing the polyphenylene oxide as defined above and other high-molecular compounds.

5. The resin composition according to claim 4, wherein the other high-molecular compound is polyolefins, polyamides, alkenylaromatic resins, rubber-modified alkenyl aromatic resins or rubbery polymers.

6. The resin composition according to claim 5, wherein the alkenylaromatic resin is a polystyrene resin.

7. The resin composition according to claim 5, wherein the rubbery polymer is a copolymer composed of 40–100% by weight of butadiene and 60–0% by weight of styrene, copolymer composed of 65–82% by weight of butadiene and 35–18% by weight of acrylonitrile, styrene-butadiene copolymer, styrene-butadiene-styrene block copolymer, styrene-grafted polybutadiene, ethylene-propylene copolymer or ethylene-propylene-diene copolymer.

8. The resin composition according to claim 1, wherein the olefin is ethylene, propylene, butene-1, isobutylene, pentene-1, hexene-1, heptene-1, octene-1, or dodecene-1.

9. The resin composition according to claim 1, wherein the content of the components (A) and (B) are 99.5–0.5 and 0.5–99.5% by weight, respectively.

10. The resin composition according to claim 1, wherein the component (A) is the polyphenylene oxide or a resin composition comprising the polyphenylene oxide and the alkenyl aromatic resin, the component (B) is a copolymer of an olefin and glycidyl methacrylate and/or glycidyl acrylate, and the content of the component (B) is 3–30% by weight.

11. The resin composition according to claim 1, wherein the component (A) is a resin composition containing a polyphenylene oxide, an alkenyl aromatic resin and a rubbery polymer, the component (B) is a copolymer of an olefin and glycidyl methacrylate and/or glycidyl acrylate, and the content of the component (B) is 0.5–20% by weight.

12. The resin composition according to claim 1, wherein the component (A) is a polyphenylene oxide resin, a resin composition comprising a polyphenylene oxide and an alkenylaromatic resin, or a resin composition containing a polyphenylene oxide, an alkenylaromatic resin and/or a rubbery polymer, and the component (B) is a copolymer of an olefin and glycidyl methacrylate and/or glycidyl acrylate, and an inorganic filler selected from the group consisting of glass fiber, calcium carbonate, silica, zinc oxide and titanium oxide is contained therein, the content of the component (B) being 1–40% by weight to the sum of the components (A) and (B).

13. The resin composition according to claim 1, which contains reinforcing materials, plasticizers, stabilizers, flame retardants, dyes or pigments.

* * * * *